J. HOCHENDONER.
FRAME FOR PICTURES AND MIRRORS.
APPLICATION FILED SEPT. 8, 1913.
1,126,468.
Patented Jan. 26, 1915.
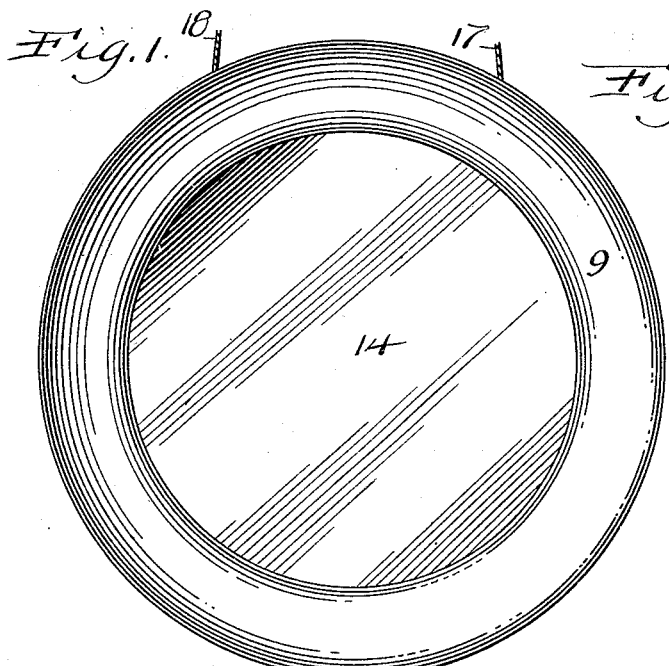
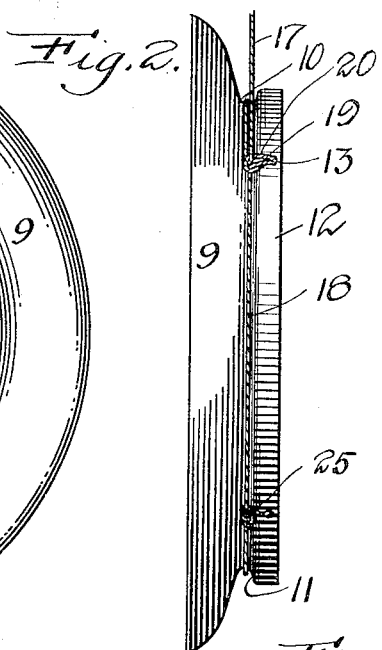
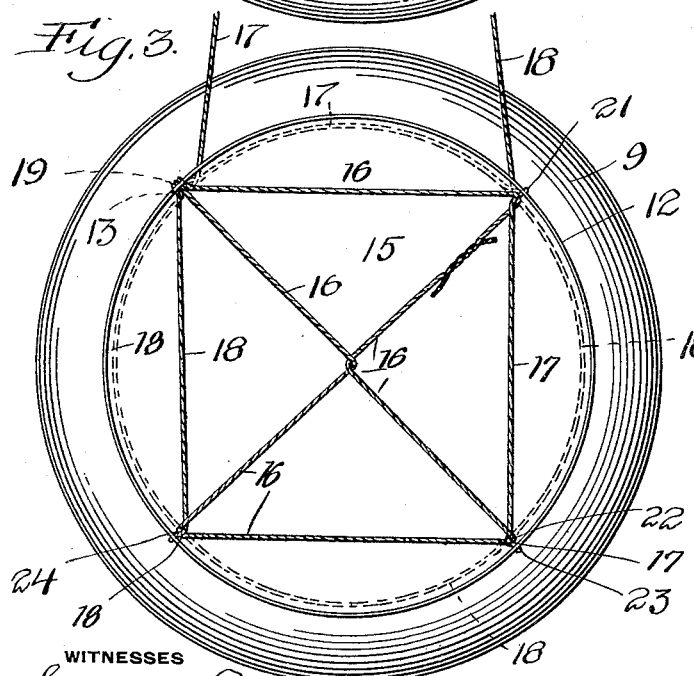
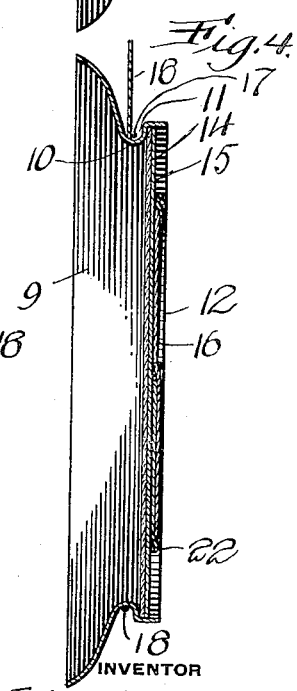
WITNESSES
Samuel Payne.
Max H. Arlontz
INVENTOR
J. Hochendoner.
By Henry C. Evert
ATTORNEY

UNITED STATES PATENT OFFICE.

JOSEPH HOCHENDONER, OF CHARLEROI, PENNSYLVANIA.

FRAME FOR PICTURES AND MIRRORS.

1,126,468.   Specification of Letters Patent.   Patented Jan. 26, 1915.

Application filed September 8, 1913. Serial No. 788,660.

*To all whom it may concern:*

Be it known that I, JOSEPH HOCHENDONER, a citizen of the United States of America, residing at Charleroi, in the county of Washington and State of Pennsylvania, have invented certain new and useful Improvements in Frames for Pictures and Mirrors, of which the following is a specification, reference being had thereto in the accompanying drawing.

This invention relates to frames for pictures and mirrors and has for its object to provide a frame consisting of a vitreous body having means, in a manner as hereinafter set forth, to enable the securing of the picture or mirror within said body.

A further object of the invention is to provide a vitreous frame for mirrors and pictures combined with flexible means for not only securing the picture or mirror within the frame, but furthermore constituting means for suspending the frame with the picture or mirror therein.

Further objects of the invention are to provide a vitreous frame for mirrors and pictures, which is simple in its construction, ornamental in appearance, strong, durable, enhancing the appearance of a picture mounted in the frame, and inexpensive to manufacture.

With the foregoing and other objects in view the invention consists of the novel construction, combination and arrangement of parts, as hereinafter more specifically described and illustrated in the accompanying drawings, wherein is shown an embodiment of the invention, but it is to be understood that changes, variations and modifications can be resorted to which come within the scope of the claim hereunto appended.

In the drawings, wherein like reference characters denote corresponding parts throughout the several views:—Figure 1 is a front elevation of a vitreous frame in accordance with this invention, and having a mirror mounted therein, Fig. 2 is a side view, Fig. 3 is a rear elevation, showing the means for securing the mirror within the frame, Fig. 4 is a vertical sectional view.

A vitreous picture frame in accordance with this invention may be of any suitable contour, by way of example, the frame is illustrated in Fig. 1 as being circular.

Referring to Figs. 1 to 4, 9 denotes a flaring body portion which is annular in plan and formed of vitreous material. The rear side of the body portion terminates in a neck 10 which is semi-cylindrical in cross section and said neck 10 terminates in an outwardly projecting flange 11 constituting a seat. Projecting rearwardly from the flange 11 is an annular rim 12 which is provided with a series of openings, preferably four and which are arranged equi-distant with respect to each other. The openings are indicated by the reference character 13. Mounted against the inner face of the flange 11 is a mirror 14 and positioned against the rear of the mirror 14 is a backing or pad 15.

The pad and mirror are secured against the seat formed by the flange 11 and maintained coupled to the body portion through the medium of a plurality of flexible members indicated at 16, 17 and 18. The member 16 is formed into a pair of oppositely disposed triangles, one corner of one of the triangles, as at 19 projecting through one of the openings 13, the projecting portion providing a loop 20. The member 17 extends through the loop 20 and then around the neck 10 and enters the opening 13 opposite that opening through which projects the loop 20, and passes under the corner 21, then under the corner 22 and out through an opening 13, as at 23 and is secured to the member 18. The member 18 extends down under the member 17 and around the neck 10 and through the loop 20, then down through the corner 24 and is then connected to itself, as at 25. By the foregoing arrangement of the flexible members 16, 17 and 18 the mirror is not only secured in the frame, but a suspension means for the frame is provided.

What I claim is:—

A frame consisting of a vitreous body portion terminating at its rear side in a neck, a lateral flange projecting from the neck, and a rearwardly extending rim projecting from the flange said flange constituting a seat against which the object to be supported in the frame is positioned, said rim being provided with openings, a means surrounding the said neck and passing through the said openings for maintaining the article within the frame and for suspending the said frame.

In testimony whereof I affix my signature in the presence of two witnesses.

JOSEPH HOCHENDONER.

Witnesses:
MAX H. SROLOVITZ,
HENRY C. EVERT.

Copies of this patent may be obtained for five cents each, by addressing the "Commissioner of Patents, Washington, D. C."